United States Patent [19]
Roster et al.

[11] Patent Number: 6,034,865
[45] Date of Patent: Mar. 7, 2000

[54] ARRANGEMENT FOR CONNECTING POWER SUPPLY LINES TO AN ELECTRONIC DEVICE AND CUBICLE WITH SUCH AN ARRANGEMENT

[75] Inventors: Thomas Roster, Ettlingen; Reinhard Schmitt, Landau, both of Germany

[73] Assignee: Siemens Aktiengesellschaft, Munchin, Germany

[21] Appl. No.: 08/945,712

[22] PCT Filed: Apr. 16, 1996

[86] PCT No.: PCT/DE96/00661

§ 371 Date: Feb. 13, 1998

§ 102(e) Date: Feb. 13, 1998

[87] PCT Pub. No.: WO96/33540

PCT Pub. Date: Oct. 24, 1996

[30] Foreign Application Priority Data

Apr. 19, 1995 [DE] Germany ............................ 295 06 628

[51] Int. Cl.[7] ...................................................... H02B 1/00
[52] U.S. Cl. ............................................................. 361/601
[58] Field of Search .................................... 361/600, 601, 361/611, 624, 637, 642, 648, 649, 650, 679

[56] References Cited

U.S. PATENT DOCUMENTS

| | | | |
|---|---|---|---|
| 3,327,176 | 6/1967 | Rexroad | 317/119 |
| 5,046,172 | 9/1991 | Moreux et al. | 361/601 |
| 5,272,592 | 12/1993 | Harris et al. | 361/637 |
| 5,274,528 | 12/1993 | Noschese et al. | 361/642 |
| 5,351,165 | 9/1994 | Hancock | 361/637 |

FOREIGN PATENT DOCUMENTS

| | | |
|---|---|---|
| 79 27 044 | 3/1980 | Germany . |
| 43 03 793 | 8/1994 | Germany . |
| 93 11 526 | 9/1994 | Germany . |

*Primary Examiner*—Gregory Thompson
*Attorney, Agent, or Firm*—Kenyon & Kenyon

[57] ABSTRACT

Arrangement for connecting power supply lines to an electronic device and a cubicle with such an arrangement The invention concerns an arrangement for connecting power supply lines (14, 24, 25) to an electronic device with terminals (4), forming the end of a rigid electric conductor (2), a plurality of which is arranged side-by-side in a receiving device (1) and combined with said device to form a terminal unit, as well as a cubicle with such an arrangement. The terminals (4) can be arranged offset in relation to one another and can be easily removed due to a two-part design of the rigid electric conductor (2). The novel arrangement advantageously provides low-loss and compact connection of power supply lines to an electronic device, making it also possible to supply an extension device in parallel. The invention is applied in electronic cubicles.

9 Claims, 5 Drawing Sheets

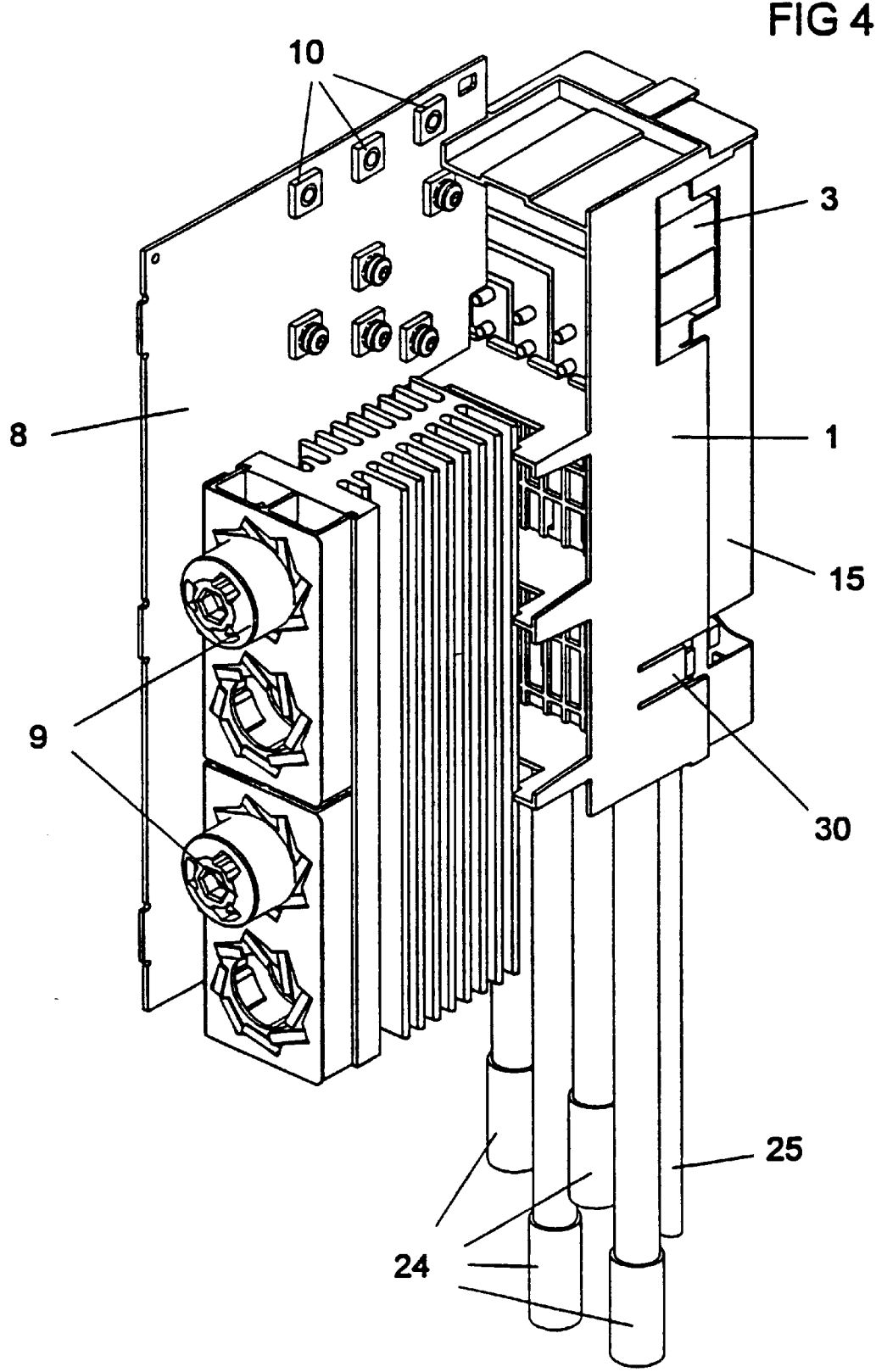

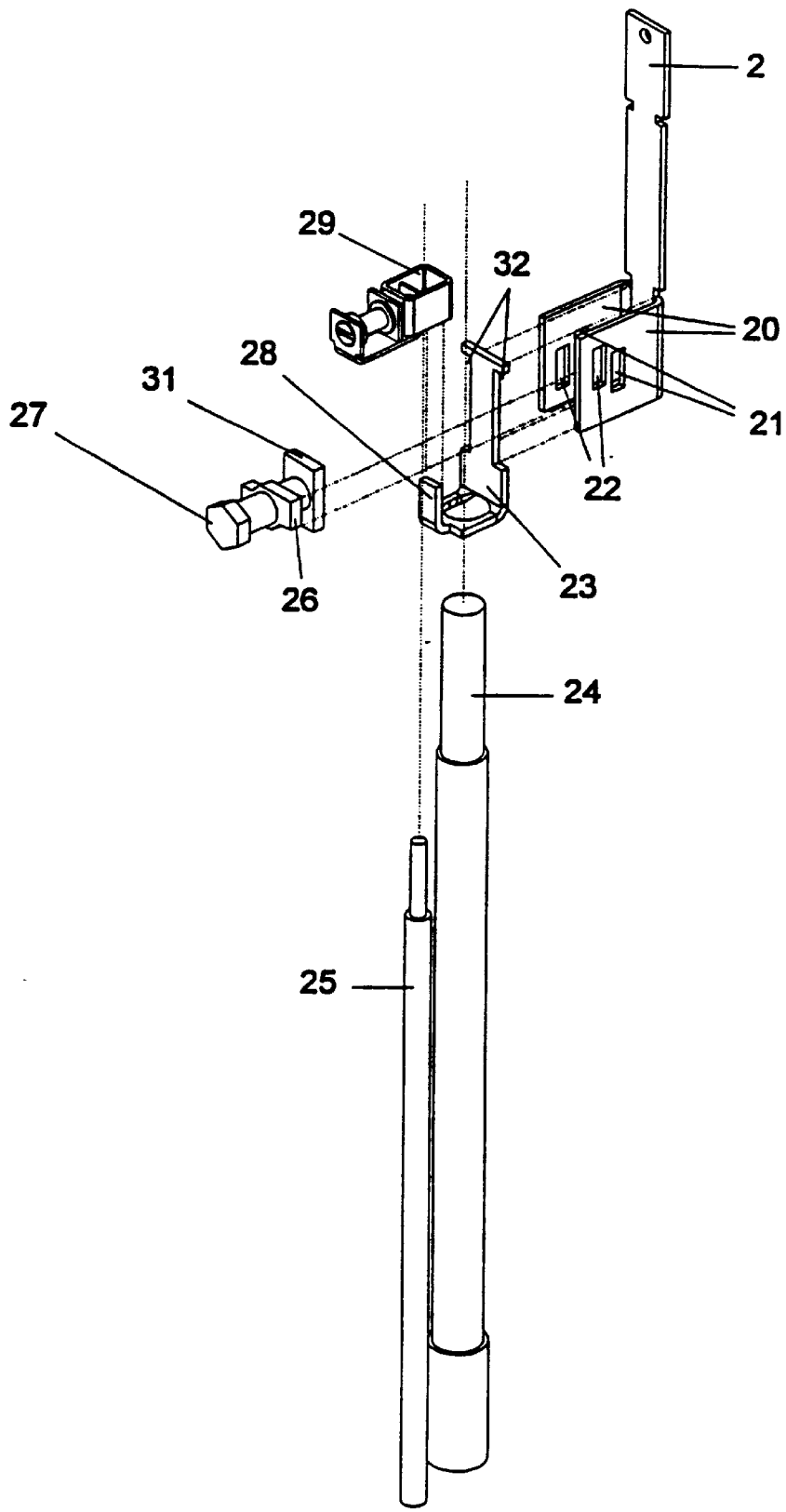

ARRANGEMENT FOR CONNECTING POWER SUPPLY LINES TO AN ELECTRONIC DEVICE AND CUBICLE WITH SUCH AN ARRANGEMENT

FIELD OF THE INVENTION

The present invention relates to an arrangement for connecting power supply lines to an electronic device and a cubicle containing such an arrangement.

BACKGROUND INFORMATION

A conventional cubicle containing an arrangement for connecting power supply lines to an electronic device is described in German Patent Application 93 11 526, where the cubicle rack, consisting of longitudinal and transversal rails, of an automation system is described. Subracks provided with components, for example, digital input and output components, are mounted into the rack. Busbars run vertically on the right-hand longitudinal rail and are connected to a circuit board arranged vertically on the lower part of the longitudinal support and provided with power supply diodes for isolating the supply voltages if a redundant power supply is used. The circuit board is connected, via flexible conductors, to a terminal arrangement consisting of terminals connected in series, arranged side-by-side horizontally and attached to a standard receiving body. The shortcomings of the conventional device include the voluminous design, the relatively high cost of commercially available terminals, relatively high power loss due to the terminal connections on the flexible conductors and due to the electrical resistance of the conductor itself, which can only be reduced by designing the conductor with a suitably large cross section. Also, in the known device, additional terminals must be installed in order to supply additional electronic devices in parallel.

SUMMARY OF THE INVENTION

An object of the present invention is to provide an arrangement for connecting power supply lines to an electronic device and a cubicle with such an arrangement that reduced-loss connection of the power supply lines in a compact design.

An advantage of the present invention is that a high-current connection is implemented, for example, for a 24 VDC power supply, for line cross sections of 16 mm$^2$ to 95 mm$^2$ for an electronic device. The present invention further allows a redundant current supply connection with two supply voltage lines and two ground lines, the possibility of a redundant connection of an extension device to be supplied in parallel, a very low-loss connection to the internal current distribution system of the devices, an EMC-compliant integration of an input filter for planar or neutral grounding, visual monitoring of the power supply contact points, safe monitoring and tightening of the energized contact points, safe disconnection of the energized load with no effect on the devices supplied in parallel, safe disconnection of the energized redundant supply potentials for simplified troubleshooting with no effect on the devices supplied in parallel, and a layout with no crossing of the power supply lines directly in the connection zone of the electronic device. In conventional devices, previously EMC-compliant integration of input filters had to be designed with additional large-surface connecting elements. Also, an advantageous arrangement of the filter directly on the terminals was not possible with the conventional devices. Furthermore safety reasons, an electronic device could only be disconnected previously with the main fuse turned off. As a result, all devices supplied in parallel had to be turned off. Furthermore the on-line diagnosis of an electronic device with a central supply was not possible with conventional devices. These disadvantages are avoided by the present invention.

BRIEF DESCRIPTION OF THE DRAWINGS

FIG. 4 shows a rear view of the arrangement.

FIG. 5 shows an embodiment of a terminal of the arrangement.

DETAILED DESCRIPTION

Figure 1:
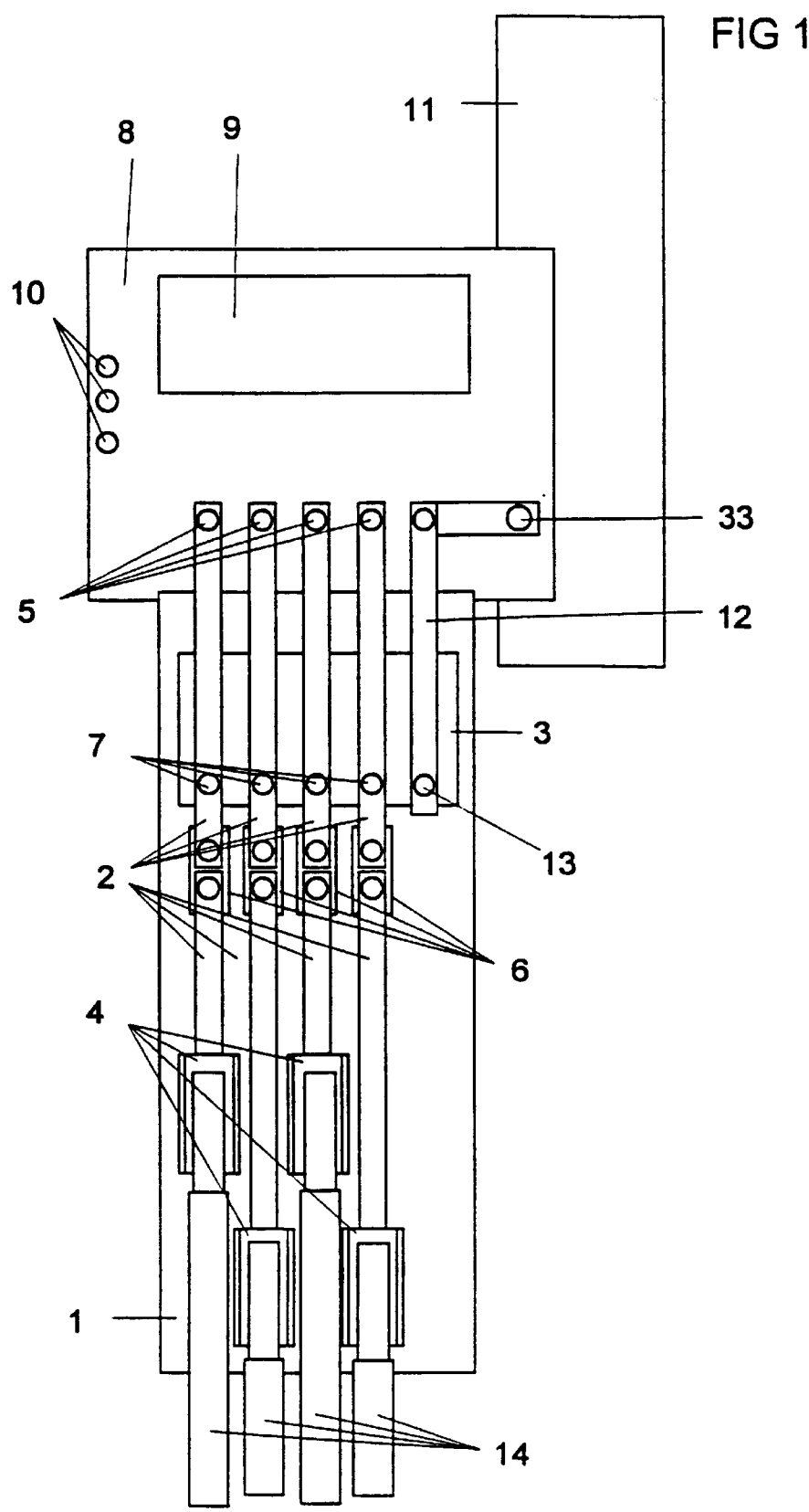
FIG. 1 shows a schematic diagram of an arrangement according to the present invention.

FIG. 1 shows four rigid electric conductors 2 inserted side-by-side into a plastic body 1. An end of each of the rigid electric conductors 2 is designed as a terminal 4 for power supply lines 14 of an electronic device. Terminals 4 are arranged offset side-by-side and, like electric conductors 2, are electrically insulated from one another by plastic body 1. This offset arrangement allows terminals 4 to be accommodated in a terminal unit in the narrowest possible space. Each rigid electric conductor 2 consists of two parts, which are electrically connected via a shorting jumper 6. Thus, terminals 14 with power supply line 14 inserted in them can be removed together with the first part of an electric conductor 2. If a power supply line 14 is looped to an extension device through a terminal 4, a main device can be isolated from terminal 4 without turning off the extension device. A second part of rigid electric conductor 2 is electrically connected to contact point 5 on a circuit board 8. Plastic body 1 also supports a supply filter 3, which is connected directly to rigid electric conductors 2 via threaded connections 7 over a large surface area. Thus, supply filter 3 is in the immediate proximity of the supply points located on terminals 4. Circuit board 8 is both the mechanical support of plastic body 1 and supply diodes 9, and the electrical distributor of the potentials to supply diodes 9 and connection points 10, through which the supply voltages are routed to the loads located inside the device. Supply diodes 9 are used for disconnecting the power supplies in the case of redundant current supply. Circuit board 8 is connected electrically to the potential of an electronic shielding on an electric conductor 11 over a large surface area and mechanically connected via fastening point 33. The shield potential is conducted by electric conductor 11 first to the connection area of supply filter 3 via circuit board 8 and then through busbar 12 to the terminal area of supply filter 3. At the end of busbar 12, a connection point 13 is formed for the shielding potential, which allows the optional use of a supply filter 3 for planar grounding or for neutral grounding.

Figure 2:
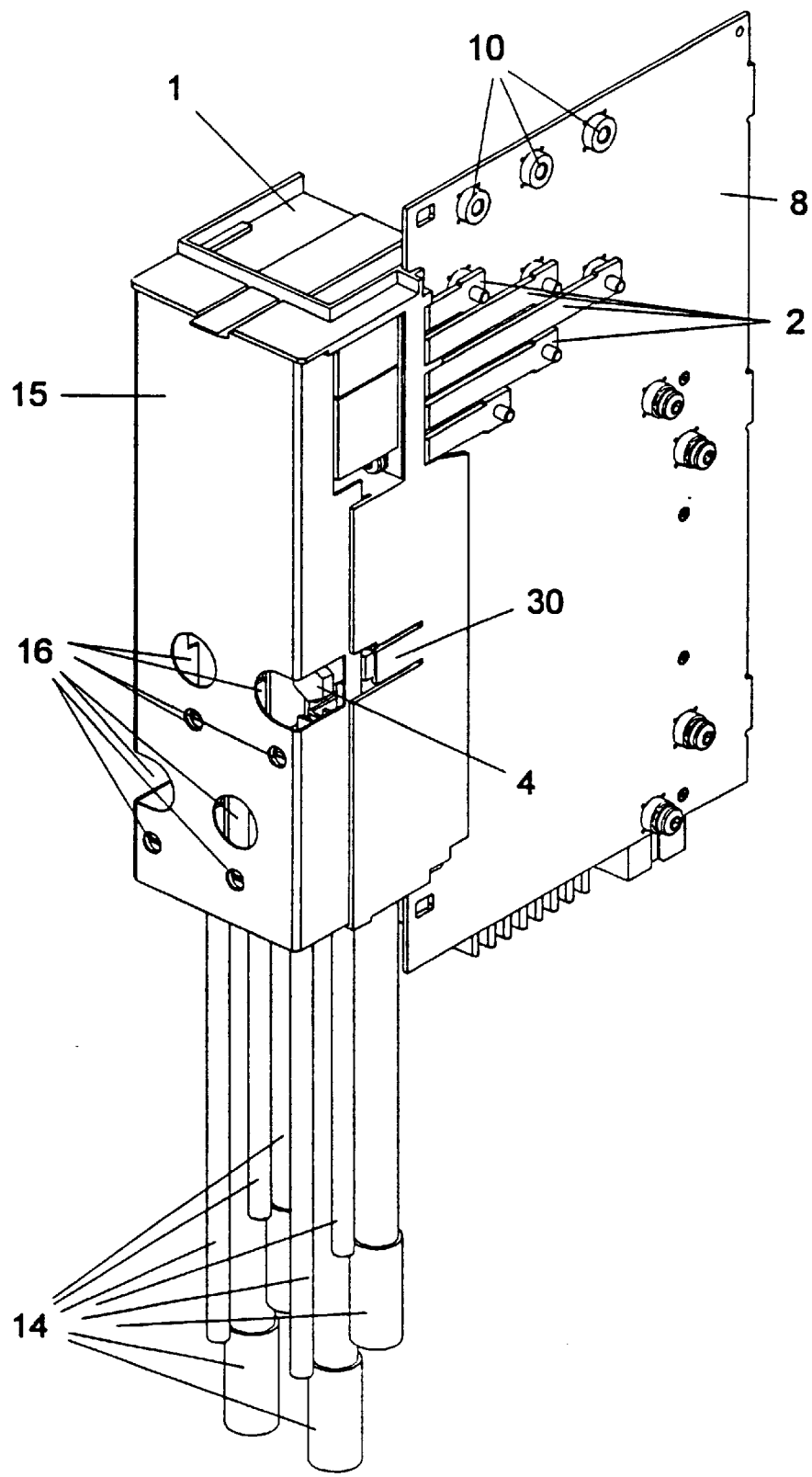
FIG. 2 shows a front view of the arrangement with the cover.

FIG. 2 shows a perspective View of an arrangement according to the present invention for connection of power supply lines. The arrangement is protected against accidental contact with the electric conductors by cover 15. Cover 15 has, in the area of terminals 4, cutouts 16, which provide safe access for a suitable tool for checking the seat of terminals 4 under load. Cover 15 is made of a transparent material, so that terminals 4 can be visually checked without difficulty. Terminals 4 are secured in place by locking hooks 30.

Figure 3:
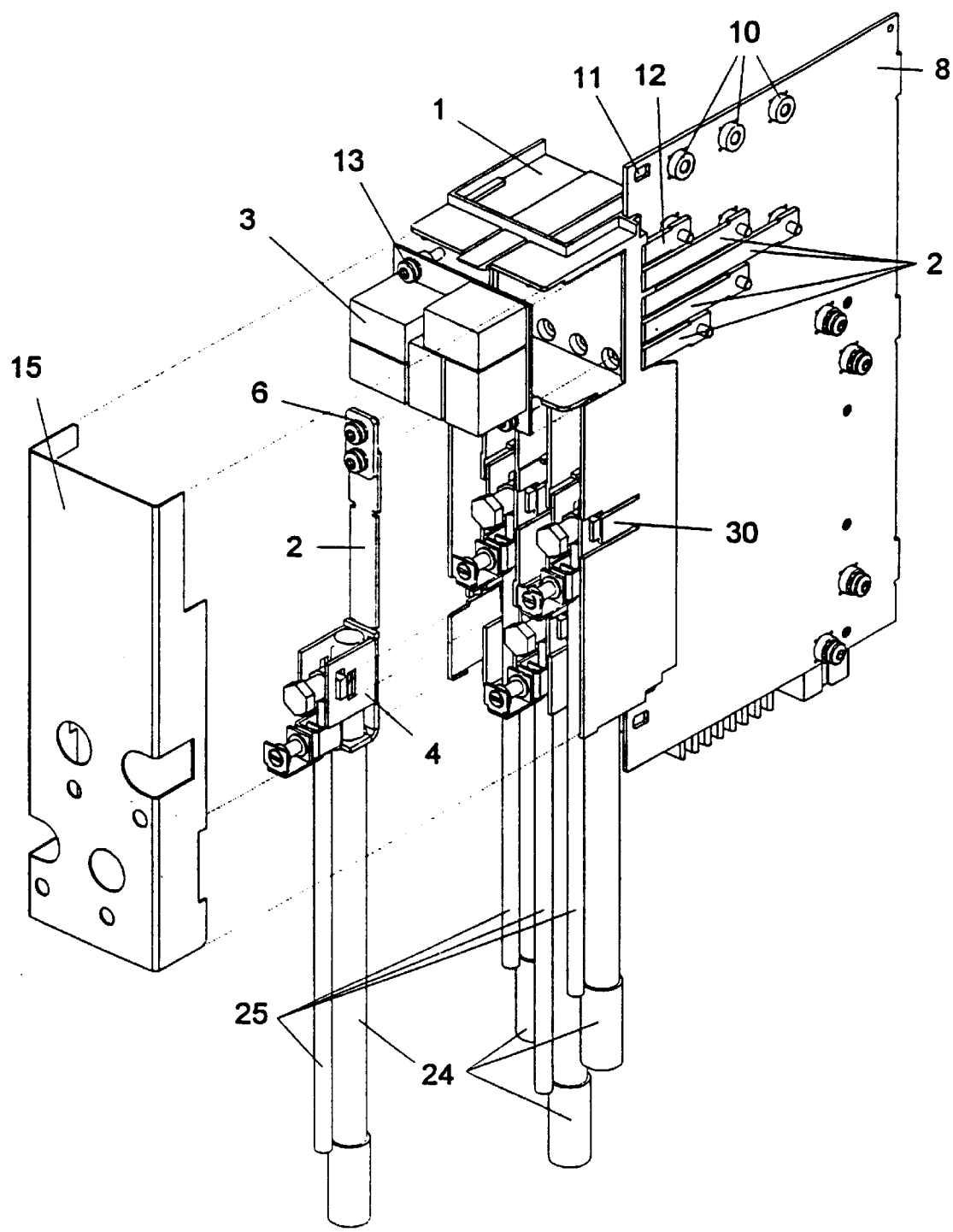
FIG. 3 shows a front view of the arrangement with the cover removed.

In FIG. 3, with cover 15 off, supply filter 3 and the first part of a rigid electric conductor 2 removed, the position of the rigid electric conductors in the grooves of plastic body 1 are clearly visible. Again, the same parts shown in FIGS. 1 and 2 are provided with the same reference numbers. Two power supply lines 24 and 25 are inserted in each one of terminals 4. One power supply line 24 is the main supply connection of the first device (main device). For this purpose, terminal 4 is designed for conductors having a cross section of 16 mm$^2$ to a maximum of 95 mm$^2$. Extension devices are connected in parallel using a power supply line 25 and thus are also supplied with power via line 24. Terminal 4 is designed for parallel connection with a power supply line 25 having a cross section of 2.5 mm$^2$ to 50 mm$^2$. As shown in FIG. 3, the first part of rigid electric conductor 2 with terminal 4 can be removed even when power supply lines 24 and 25 are connected to it. Also each of power supply lines 24 or 25 can be inserted in a terminal 4 independently of one another. Thus, in the terminal arrangement according to the invention, both main and extension devices can be operated independently of one another in relation to the power supply connection. As a result no additional costly terminals are required for supplying an extension device in parallel. FIG. 3 also illustrates the particularly compact design of a terminal unit according to the present invention.

FIG. 4 shows the rear view of the arrangement illustrating the supply diodes 9 for decoupling the power supplies if a redundant current supply is implement. Although two supply diodes 9 are shown; two additional supply diodes can be installed if needed. Plastic body 1 and the diode unit are supported by circuit board 8, which is also responsible for distributing the potential.

According to FIG. 5, the first part of a rigid electric conductor 2, whose end is configured as a terminal 4, has two side brackets, which are bent so that they form two parallel legs 20 of a U-shaped groove. There are rectangular cutouts 21 and 22 in legs 20 of the U-shaped end of rigid electric conductor 2. When the rigid electric conductor 2 is inserted in plastic body 1, locking hooks 30 of plastic body 1 snap into rectangular cutouts 21 and ensure firm seating of conductor 2 in plastic body 1 (see also FIG. 3). When only power supply line 24 is to be connected, i.e., when no extension device is to be additionally supplied with power via power supply line 25, contact bridge 23 and terminal screw 29, which would otherwise be required for power supply line 25, are no longer needed. The isolated power supply line 24 is then placed into the U-shaped groove between legs 20. A pressure plate 31 and an end support 26 with a terminal screw 27 are aligned parallel to legs 20 and positioned between them. By turning terminal screw 27, stop edges of end support 26 are moved toward legs 20. When end support 26 has reached the position of rectangular cutouts 22 in legs 20, end support 26 rotates further due to the thread friction and swivels into rectangular cutouts 22. The walls of rectangular cutouts 22 prevent support 26 from rotating further. If terminal screw 27 is further tightened, the isolated end of power supply line 24, together with pressure plate 31, is pressed against the bottom of the U-shaped groove and a reliable contact is established. When an extension device is connected in parallel using power supply line 25, contact bridge 23 must be used. It has a circular opening, through which the isolated end of power supply line 24 is inserted. Power supply line 24 and contact bridge 23 are now brought between legs 20 of the U-shaped groove together. Contact bridge 23 is firmly positioned on legs 20 due to side notches 32 in contact bridge 23. As described above, power supply line 24, which is now provided with contact bridge 23, is connected using terminal screw 27. To connect power supply line 25 for supplying an extension device, a terminal screw 29 is pushed through a contact lug 28, supply 25 is placed into the opening of terminal screw 29, and terminal screw 29 is tightened. Thus a secure contact is achieved between power supply lines 24 and 25 in the terminal unit using simple means.

What is claimed is:

1. An apparatus for connecting at least two power supply lines to an electronic device, comprising:

a receiving device;

a plurality of rigid electric conductors arranged side by side in the receiving device, each of the rigid electric conductors including a first part and a second part the first rigid conductor, part being separable from the second rigid conductor part an electrically connected to the second part when the first part is in the receiving device; and a plurality of terminals, each terminal of the plurality of terminals forming an end of the first part of a respective one of the rigid electric conductors, wherein each of at least two power supply lines connects to one of the plurality of terminals independently from another one of the at least two power supply lines, and wherein the first part of each of the rigid electric conductors is individually removable from the receiving device.

2. The apparatus according to claim 1, wherein the plurality of terminals are arranged offset to each other.

3. The apparatus according to claim 1, wherein the receiving device includes a plastic body having grooves for receiving the rigid electric conductors, and wherein the apparatus comprises:

locking connectors for maintaining the rigid electric conductors in the grooves.

4. The apparatus according to claim 3, comprising:

a supply filter filtering a supply voltage, the supply filter being mounted on the second part of each of the rigid electric conductors.

5. The apparatus according to claim 1, comprising:

a cover provided for the receiving device.

6. The apparatus according to claim 5, wherein each of the plurality of terminals includes a terminal screw, and wherein the cover has cutout portions in an area of the terminal screws, the terminal screws being accessible through the cutout portions.

7. The apparatus according to claim 5, wherein the cover is composed of a transparent material.

8. The apparatus according to claim 1, wherein each of the first part and the second part is a rigid, elongated conductor part.

9. The apparatus according to claim 1, wherein the end of each first part formed by each terminal is distal to the second part when the first part is positioned in the receiving device, a second end of the first part being proximate to the second part when the first part is positioned in the receiving device.

* * * * *